United States Patent
Endo et al.

(10) Patent No.: US 7,486,886 B2
(45) Date of Patent: Feb. 3, 2009

(54) PHOTO-MICROGRAPHING DEVICE AND ITS CONTROL METHOD

(75) Inventors: Hideaki Endo, Tokyo (JP); Akitsugu Kagayama, Tokyo (JP); Katsuyoshi Yamaguchi, Tokyo (JP)

(73) Assignee: Olympus Corporation, Tokyo (JP)

( * ) Notice: Subject to any disclaimer, the term of this patent is extended or adjusted under 35 U.S.C. 154(b) by 400 days.

(21) Appl. No.: 11/330,874

(22) Filed: Jan. 11, 2006

(65) Prior Publication Data

US 2006/0176367 A1    Aug. 10, 2006

(30) Foreign Application Priority Data

Feb. 10, 2005    (JP) ............................. 2005-034110

(51) Int. Cl.
*G02B 21/36* (2006.01)

(52) U.S. Cl. ...................... 396/432; 359/369

(58) Field of Classification Search ................ 396/265, 396/96, 432; 348/219.1, 79, 80; 359/373, 359/369

See application file for complete search history.

(56) References Cited

U.S. PATENT DOCUMENTS

| | | |
|---|---|---|
| 6,711,283 B1 | 3/2004 | Soenksen |
| 2003/0227673 A1* | 12/2003 | Nakagawa ................. 359/380 |
| 2004/0090670 A1 | 5/2004 | Kawanabe et al. |
| 2004/0170312 A1 | 9/2004 | Soenksen |
| 2004/0252875 A1 | 12/2004 | Crandall et al. |
| 2006/0028716 A1 | 2/2006 | Gilbert |

FOREIGN PATENT DOCUMENTS

| | | |
|---|---|---|
| JP | 2002-277754 A | 9/2002 |
| WO | WO 2004/034124 A1 | 4/2004 |

OTHER PUBLICATIONS

European Patent Office Communication dated Aug. 12, 2008, issued in a counterpart European Application.

* cited by examiner

*Primary Examiner*—Melissa J Koval
*Assistant Examiner*—Autumn Parker
(74) *Attorney, Agent, or Firm*—Frishauf, Holtz, Goodman & Chick, P.C.

(57) ABSTRACT

A photo-micrographing device includes a microscope, a unit for obtaining an image of an inspection object, a unit for setting a plurality of view fields of the microscope and storing position information of a stage corresponding to each view field, a unit for storing setting information of the microscope and a camera unit in each view field, a unit for storing shooting conditions corresponding to each view field where time-lapse shooting is applied, a unit for obtaining a time-lapse shooting image for each view field where the time-lapse shooting is applied, based on the stored position information, the stored setting information and the stored shooting conditions, and a unit for collectively displaying latest taken time-lapse shooting images for each view field where the time-lapse shooting is applied.

6 Claims, 14 Drawing Sheets

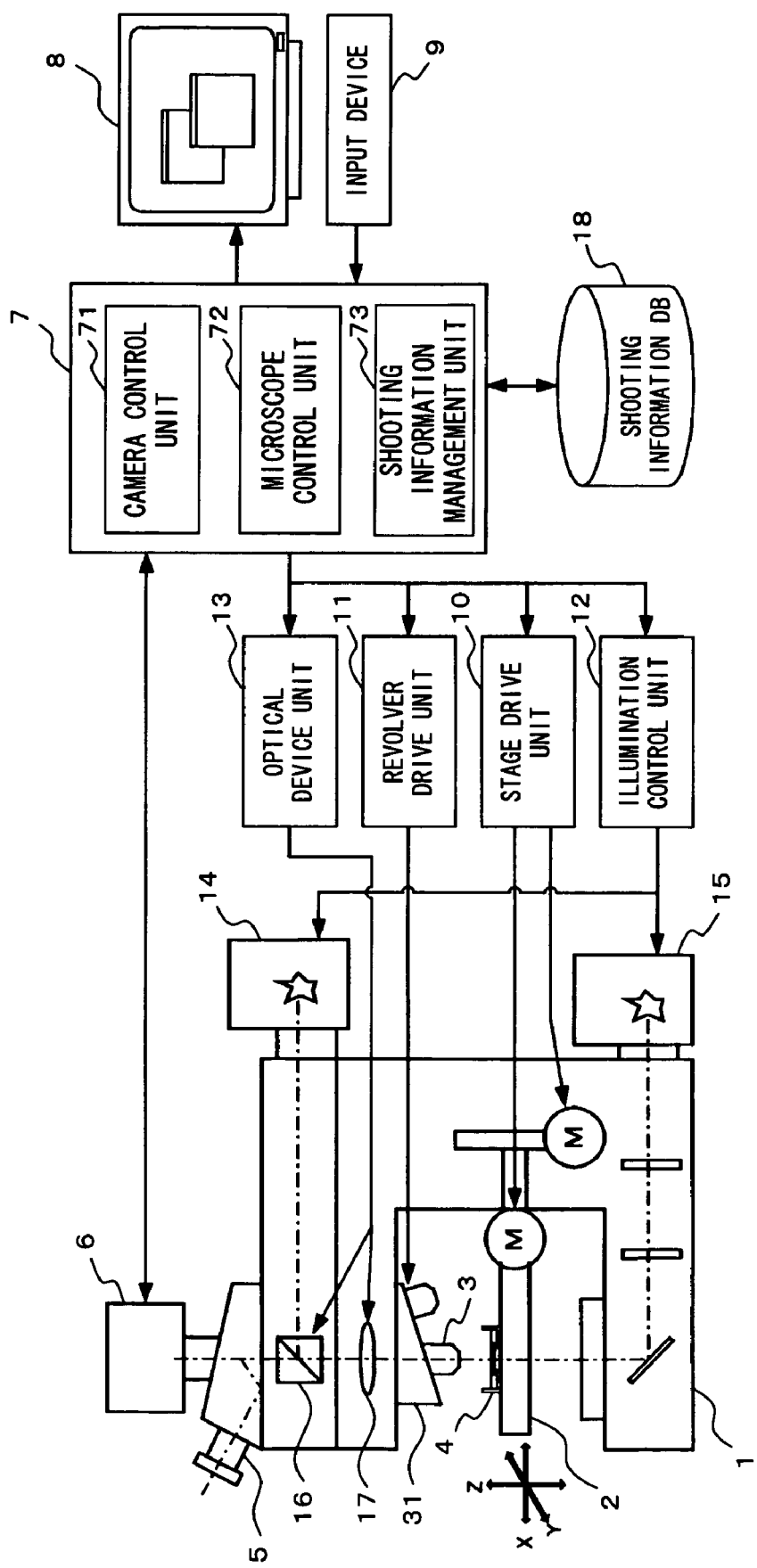
F I G. 1

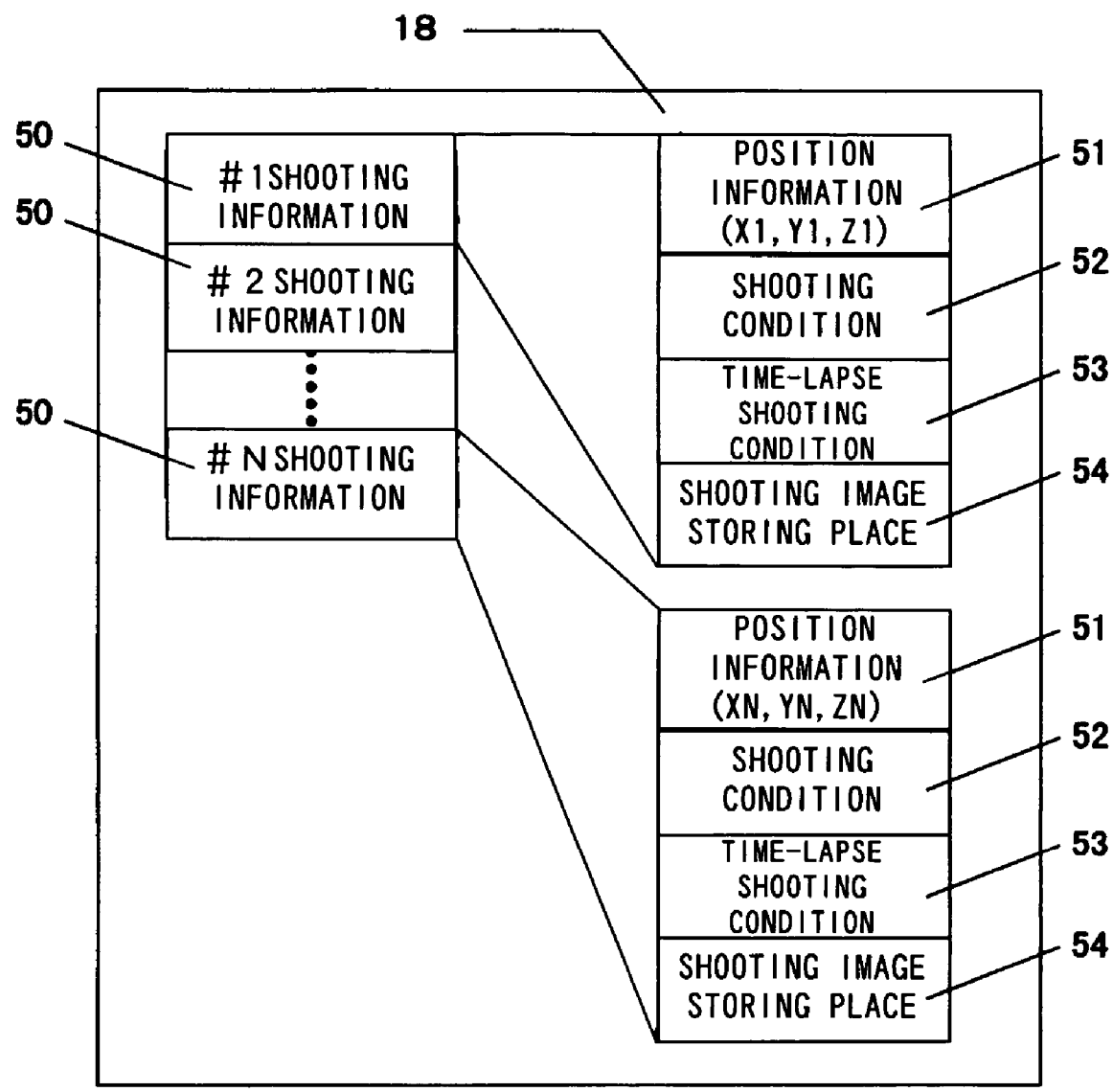
F I G. 2

US 7,486,886 B2

PHOTO-MICROGRAPHING DEVICE AND ITS CONTROL METHOD

CROSS REFERENCE TO RELATED APPLICATIONS

This application claims the benefit of Japanese Application No. 2005-34110, filed Feb. 10, 2005, the contents of which are incorporated by this reference.

BACKGROUND OF THE INVVENTION

1. Field of the Invention

The present invention relates to a Photo-micrographing device for shooting a microscopic images at specific intervals (time-lapse shooting) and its control method and more particularly relates to a Photo-micrographing device for displaying as a list microscopic images taken by multi-point time lapse shooting for simultaneously applying time-lapse shooting to a plurality of shooting ranges and applying desired shooting control to each microscopic image and its control method.

2. Description of the Related Art

Conventionally, as a method for observing an inspection object by a microscope, a method for shooting microscopic images at specific intervals hereinafter called "time-lapse shooting"), reproducing a series of taken images after shooting and observing the time-wise morphological change of an inspection object as moving images is used. Such a method is very effective when observing the time change of a specific inspection object, such as a live cell, existing within the microscopic view field.

Recently, when confirming the effect of a plurality of reagents on cells cultured on the same condition, when observing the time change of different cells in the same environment at the same time and the like, time-lapse shooting is sometimes applied in a plurality of shooting positions.

In such a shooting method for applying time-lapse shooting to a plurality of shooting ranges (hereinafter called "multi-point time-lapse shooting), the plurality of shooting ranges are not always located within the same microscopic view field. Often some of the shooting ranges are located out of the microscopic view field of the inspection object or some inspection objects are different.

As such a shooting method, Japanese Patent Application Publication No. 2002-277754 discloses a configuration to which multi-point time-lapse shooting can be applied by mounting an inspection object on a stage whose X, Y and Y axes can be controlled and setting in advance the positional coordinates of a plurality of shooting ranges, the exposure value of an imaging device in the position, the shooting interval of time-lapse shooting applied to the shooting ranges and the number of taken images and the like, and its method.

However, in the conventional method, since the setting of a time-lapse waiting time and the number of taken images are the same for all observation ranges, only a series of multi-point time-lapse shooting can be applied to only a plurality of inspection objects which are similarly compared and examined. In this case, even when a culturing environment is the same and there is room for the number of inspection objects mounted on the stage, an experiment for comparing time changes at different intervals or the like must be separately performed. Specifically, when the changing speed of a cell being an inspection object is slow or long changes continue, one series of shooting sequence of time-lapse shooting often takes several days to several weeks. Therefore, plural types of experiments take a lot of time.

An optimal exposure value varies due to the time change of a cell, a cell moves out of an observation range or an image becomes out of focus. When the modification of the shooting range (shooting magnification) is needed in the course of a time change, image data obtained for a long time will be wasted since time-lapse shooting continues.

Furthermore, even after a cell dies or a morphological change converges, the set number of images are taken. Therefore, a huge image file wastes a storage memory capacity.

SUMMARY OF THE INVENTION

According to one aspect of the present invention, the Photo-micrographing device comprises a microscope whose stage for holding an inspection object and whose object lens for focusing light on the inspection object can be relatively moved three-dimensionally, a camera unit for shooting the inspection object and obtaining an inspection object image, a position storage unit for setting the view field of the microscope by relatively moving the stage or the object lens and storing the position information of the stage corresponding to the view field, a setting information storage unit for storing the setting information of the microscope and camera unit about the view field, a time-lapse information storage unit for storing shooting conditions in the case where time-lapse shooting is applied to the view field, a camera control unit for obtaining a time-lapse shooting image for each view field, based on the position information stored in the position storage unit, the setting information stored in the setting information storage unit corresponding to the position information and the shooting conditions stored in the time-lapse information storage unit and an image display unit for collectively displaying the latest time-lapse shooting image taken by the camera control unit for each view field.

BRIEF DESCRIPTION OF THE DRAWINGS

The present invention will be more apparent from the following detailed description when the accompanying drawings are referenced.

FIG. 1 shows the basic configuration of the Photo-micrographing device of the present invention;

FIG. 2 shows the data structure of a shooting information database 18;

DESCRIPTION OF THE PREFERRED EMBODIMENTS

Figure 3:
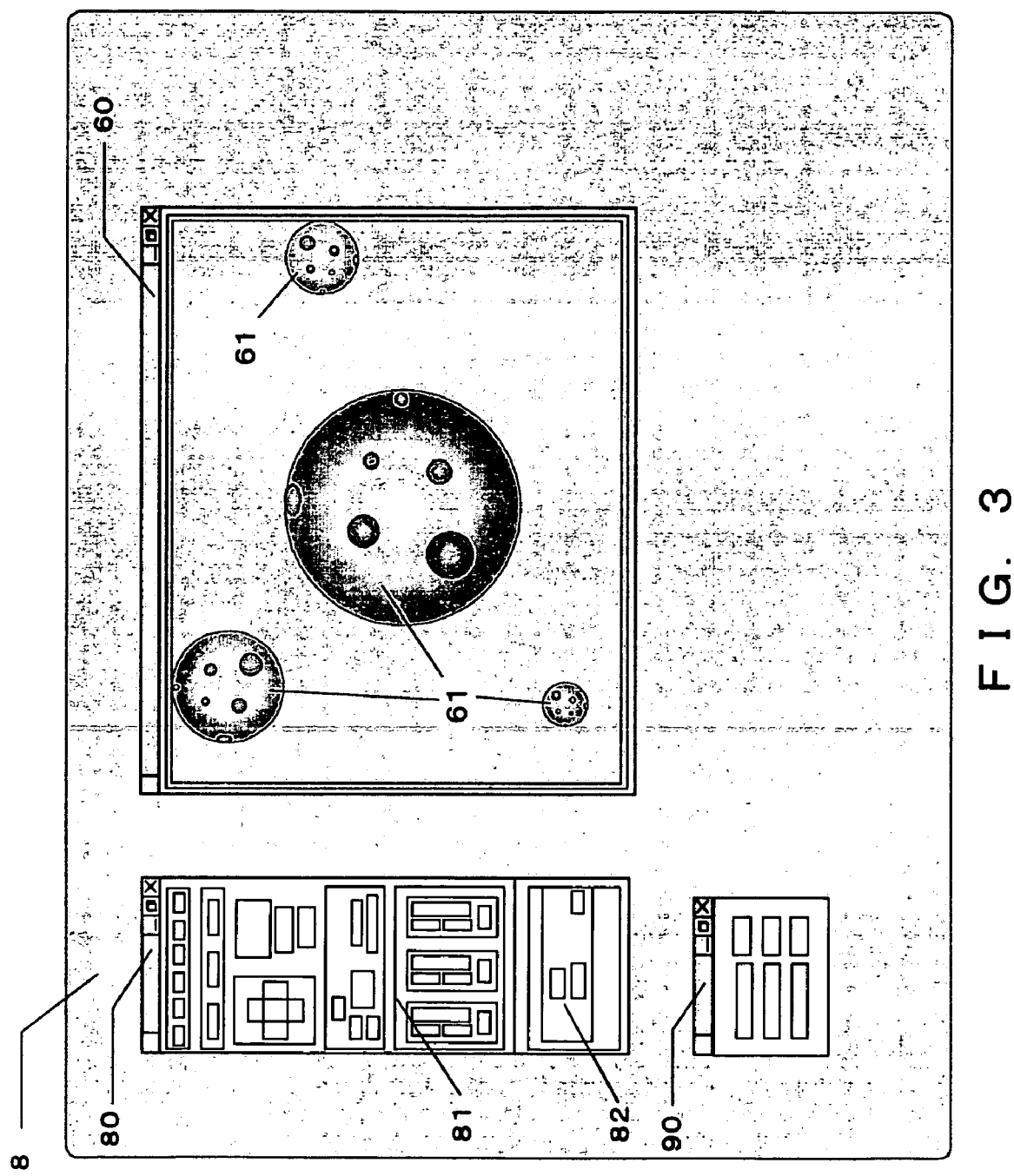
FIG. 3 shows an example of the display screen of a monitor 8 (No. 1)

The preferred embodiments of the present invention are described below with reference to the drawings.

Specifically, according to one aspect of the present invention, the Photo-micrographing device comprises a microscope in which a stage for holding an inspection object and an object lens for focusing light on the inspection object can be relatively moved three-dimensionally, a camera unit for shooting the inspection object and obtaining an inspection object image, a position storage unit for setting the view field of the microscope by relatively moving the stage or the object lens and storing the position information of the stage corresponding to the view field, a setting information storage unit for storing the setting information of the microscope and camera unit about the view field, a time-lapse information storage unit for storing shooting conditions in the case where time-lapse shooting is applied to the view field, camera control unit for obtaining a time-lapse shooting image for each view field, based on the position information stored in the position storage unit, the setting information stored in the setting information storage unit corresponding to the position information and the shooting conditions stored in the time-lapse information storage unit and an image display unit for collectively displaying the latest time-lapse shooting image taken by the camera control unit for each view field.

Thus, when applying multi-point time-lapse shooting, each independent number of images can be taken at each independent time-lapse waiting time. Therefore, a plurality of cells each of which presents a different time change can be simultaneously shot, thereby greatly reducing a shooting time.

Since the latest image of each shooting range is displayed on a multi-screen, the behaviors of an inspection body can be monitored in all observation ranges at a glance, thereby quickly catching the status change of each inspection object.

In the Photo-micrographing device of the present invention, it is preferable for the camera control unit to have a shooting interruption control function to interrupt a shooting operation for each view field during time-lapse shooting and a shooting re-start control function to re-start interrupted shooting and for the image display unit to have a shooting status notification function to display the interruption of shooting by the shooting interruption control function or the re-start by the shooting re-start control function.

Thus, only an observation range the shooting of which there is no need to continue during multi-point time-lapse shooting can be interrupted. Therefore, useless shooting time can be reduced, and the waste of storage memory due to an unnecessary image file can be avoided.

In the Photo-micrographing device of the present invention, it is preferable for the position storage unit, setting information storage unit and time-lapse information storage unit to have a information modification function to be able to modify the stored information about the view field whose shooting is interrupted by the shooting interruption control function.

Thus, a variety of shooting conditions can be modified during the temporary stoppage of time-lapse shooting. Therefore, for example, inaccurate shooting due to movement of an inspection body, inaccurate shooting exposure due to change of the amount of light accompanying the time change of the inspection object and the like are avoided and can be corrected in advance. Furthermore, even when the inspection object rapidly changes in the middle, an appropriate time-lapse waiting time can be always reset. Therefore, no shooting chance is lost.

In the Photo-micrographing device of the present invention, it is preferable for the camera control unit to have a real-time shooting function to shoot a live image in a selected view field while not applying time-lapse shooting and for the image display unit to have a real-time image display function to display the live image from the camera control unit in a display position corresponding to the selected view field.

Thus, the correction of shooting conditions during temporary shooting stoppage or the like can be precisely made, thereby realizing a stable shooting operation.

In the Photo-micrographing device of the present invention, it is preferable for the camera control unit to specify the closest one of unfinished view fields as a subsequent shooting range when determining the shooting order of a plurality of view fields.

Thus, when shooting a plurality of shooting ranges reaching shooting chances, a time needed to shoot them can be reduced as much as possible. Therefore, highly accurate multi-point time-lapse shooting can be applied at a preset time-lapse waiting time.

According to another aspect of the present invention, the microscopic shooting control method of the present invention is implemented by a microscope whose stage for holding an inspection object and whose object lens for focusing light on the inspection object can be relatively moved three-dimensionally. The control method comprises shooting the inspection object and obtaining an inspection object image, setting the view field of the microscope by relatively moving the stage or object lens, storing the position information of the stage, corresponding to the view field, storing the setting information in the view field about the microscope and shooting, storing shooting conditions in the case where applying time-lapse shooting to the view field, obtaining time-lapse shooting image of each view field, based on the stored position information, setting information corresponding to the position information and stored shooting conditions, and collectively displaying the latest taken time-lapse shooting image for each view field.

Thus, when applying multi-point time-lapse shooting, each independent number of images can be taken at each independent time-lapse waiting time. Therefore, a plurality of cells each of which presents a different time change can be simultaneously shot, thereby greatly reducing a shooting time.

Since the latest image of each shooting range is displayed on a multi-screen, inspection behaviors in all observation ranges can be monitored at a glance, thereby quickly catching the status change of each inspection object.

THE FIRST PREFERRED EMBODIMENT

FIG. 1 shows the basic configuration of the Photo-micrographing device of the present invention.

In FIG. 1, in the microscope 1, an electromotive stage 2 and an object lens 3 which can be three-dimensionally move as a view field selection means and a focusing means 3, respectively, are disposed facing each other. The electromotive stage 2 holds an inspection object 4, enables an operator to observe the inspection object 4 by his/her eyes via an eye lens 5 and the object lens 3 and enables a camera unit 6 provided with a CCD imaging device to shoot the inspection object. A control unit 7 is also connected to the camera unit 6.

The control unit 7 comprises a camera control unit 71, a microscope control unit 72 and a shooting information management unit 73. A monitor 8, an input device 9, a stage drive unit 10, a revolver drive unit 11, an illumination control unit 12 and an optical device control unit 13 are connected to the control unit 7.

The control unit 7 also comprises a central processing unit (CPU), random-access memory (RAM), an input/output device, an external storage device, such as a hard disk and the like, which are all connected to the CPU by a bus and are not shown in FIG. 1.

The external storage device stores a program for enabling the CPU to operate as the camera control unit 71, microscope control unit 72 and shooting information management unit 73. The program can be executed, for example, using Windows (registered trademark) of Microsoft Corporation as basic software, and all instructions can be issued via a pointing device, such as a mouse, etc., and the input device 9, such as a keyboard, etc.

The microscope control unit 72 enables the stage drive unit 10, revolver drive unit 11, illumination control unit 12 and optical device control unit 13 to perform operations needed for shooting. The camera control unit 71 applies a variety of control to the camera unit 6 according to necessary shooting conditions and also enables the monitor 8 to display a taken inspection object image.

The stage drive unit 10 drives the electromotive stage 2 on the X-Y plane (horizontally) and upward and downward (vertically: in the Z direction), according to the instruction of the microscope control unit 71.

The revolver drive unit 11 rotates a revolver 31 according to the instruction of the microscope control unit 71 to locate an object lens 3 with a desired magnification on a light path.

The illumination control unit 12 controls a variety of illumination need for shooting. Specifically, the illumination control unit 12 adjusts the amount of light of an incident-light illumination light source 14 for illuminating the inspection object from the top and a transmission-light illumination light source 15 for illuminating the inspection object from the bottom, according to the instruction of the microscope control unit 72.

The optical device control unit 13 inserts/removes a variety of filters, polarization devices and the like 16 needed to perform a variety of macroscopic inspections, such as polarization, phase difference, Nomarski, fluorescence and the like in/from the light path or exchanges magnification change lenses 17 which can easily perform observation magnification and the like, according to the instruction of the microscope control unit 72.

The inspection object 4 is for example, a specimen in which a plurality of cells is fixed at the bottom of a transparent container with a culture solution.

A shooting information database 18 is connected to the shooting information management unit 73.

FIG. 2 shows the data structure of the shooting information database 18.

In FIG. 2, the shooting information database 18 stores shooting information 50 for each of shooting ranges No. 1 through No. N. In this case, each piece of shooting information 50 is composed of positional coordinates 51 of shooting ranges indicated by $(X_1, Y_1, Z_1), (X_2, Y_2, Z_2), \ldots$ and $(X_N, Y_N, Z_N)$, shooting conditions 52, time-lapse shooting conditions 53 and the storing place 54 of time-lapse shooting images.

It is generally known that time-lapse shooting images amounts to a huge volume. Therefore, in the first preferred embodiment, the images are stored in a hard disk as a file.

The time-lapse shooting images of shooting ranges #1-#N are time-sequentially stored in each of storing places 54 in the following order of the first taken image→a subsequent taken image→its subsequent taken image→ . . . and so on. The file format in this case can be a still image file with a time-sequentially consecutive name (Tiff, Jpeg, etc.) or moving image file generated based on the time-sequential still image (AVI, Mpeg, etc.).

The description returns to FIG. 1.

The electromotive stage 2 has a mechanical origin in each of the X, Y and Z directions. The microscope control unit 72 can recognize the current positional coordinates of the electromotive stage 2 by internally managing the specified amount of movement of the stage drive unit 10, using this mechanical origin as a base. Specifically, the microscope control unit 72 has a function as a position detection means for detecting the position of the electromotive stage 2 against the optical axis of the object lens 3, and outputs the current positional coordinates (X, Y, Z) of the electromotive stage 2 as the current position of an observation range. Alternatively, a position detection means for detecting the current position of the electromotive stage 2 can be separately provided, and this position detection means can recognize the current position of the electromotive stage 2.

Next, the operation of the Photo-micrographing device with such a configuration is described.

Firstly, preparations are made for time-lapse shooting.

Firstly, the camera control unit 71 of the control unit 7 displays an image display window 60 for displaying a microscopic image as shown in FIG. 3, a control window 80 for setting a shooting range, shooting conditions and the like and a recipe window 90 for operating a preset recipe, which will be described later, on the screen of the monitor 8.

In this case, the image display window 60 displays a plurality of cells being microscopic images taken by the camera unit 6 via the object lens 3 as the observation image of the inspection object 4 on the electromotive stage 2.

The control window 80 comprises a microscope control graphical user interface (GUI) unit 81 for selecting an object lens 3 to be used, switching illumination light and adjusting the amount of light, inserting/removing a variety of optical devices in/from a light path, zooming an observation image, moving the electromotive stage 2 on the X-Y plane or vertically and the like, and camera control GUI unit 82 for setting the start of automatic exposure operation (hereinafter called "AE") for setting an optimal exposure time when shooting or manually setting shooting conditions, such as an exposure time and setting time-lapse shooting interval, the number of taken images or the like, based on the information about a currently taken image, in the camera unit 6.

The recipe window 90 reproduces the status of each unit, deleting a registered list and the like, based on a list in which all parameters, such as the status of the microscope 1, shooting conditions and the like, which are set on the control window 80, are registered in advance as one data group (hereinafter called "list").

Next, in the above-described status, a shooting range and shooting conditions are set.

Firstly, an image to shoot is focused by moving the electromotive stage 2 in the X, y and z directions by operating a stage moving button, which is not shown in FIG. 3, of the microscope control GUI unit 81. An illumination status is selected and an optical device is selected according to an inspection method, by operating a variety of operation buttons, which are not shown in FIG. 3, of the microscope control GUI unit 81.

Then, an exposure time used for shooting is set by pushing the AE button, which is not shown in FIG. 1, of the camera control GUI unit 82 or writing a value in an exposure time input box, which is not shown in FIG. 1, of the camera control GUI unit 82.

Since the camera control unit 71 issues an instruction to the camera unit 6, based on the set exposure time, an image displayed in real time on the image display window 60 is actually taken.

Furthermore, shooting conditions, such as a time-lapse shooting interval, the number of taken images and the like in the set shooting range, are set by operating the setting button, input box or the like, which are not shown in FIG. 1, of the camera control GUI unit 82.

Then, after the above-described settings in the current shooting range are completed, a register button, which is not shown in FIG. 1, of the recipe window 90 is pushed to register the setting statuses. Thus, the setting data is stored in the shooting information 50 of the shooting database 18. For example, the current coordinates (X, y, Z) of the electromotive stage 2, the setting information of the microscope and an exposure time, and time-lapse waiting time and the number of taken images are stored in the positional coordinates 51, shooting conditions 52 and time-lapse shooting conditions 53, respectively, in the storage area of a shooting range #1. At this moment, no image data is stored in the time-lapse shooting image storing place 54.

By repeating the above-described operations, the shooting information 50 of the desired shooting ranges #0-#N is stored in the shooting information database 18.

The registered information is added to a drop-down box, which is not shown in FIG. 3, of the recipe window 90 as a list, and by selecting a set list, a shooting range and shooting conditions, corresponding to the list can be reproduced and a registered list can be deleted.

Next, actual shooting which is made based on such a preparation is described.

Firstly, if all settings are completed, a shooting start button, which is not shown in FIG. 3, in the control window 80 is pushed.

Figure 4:
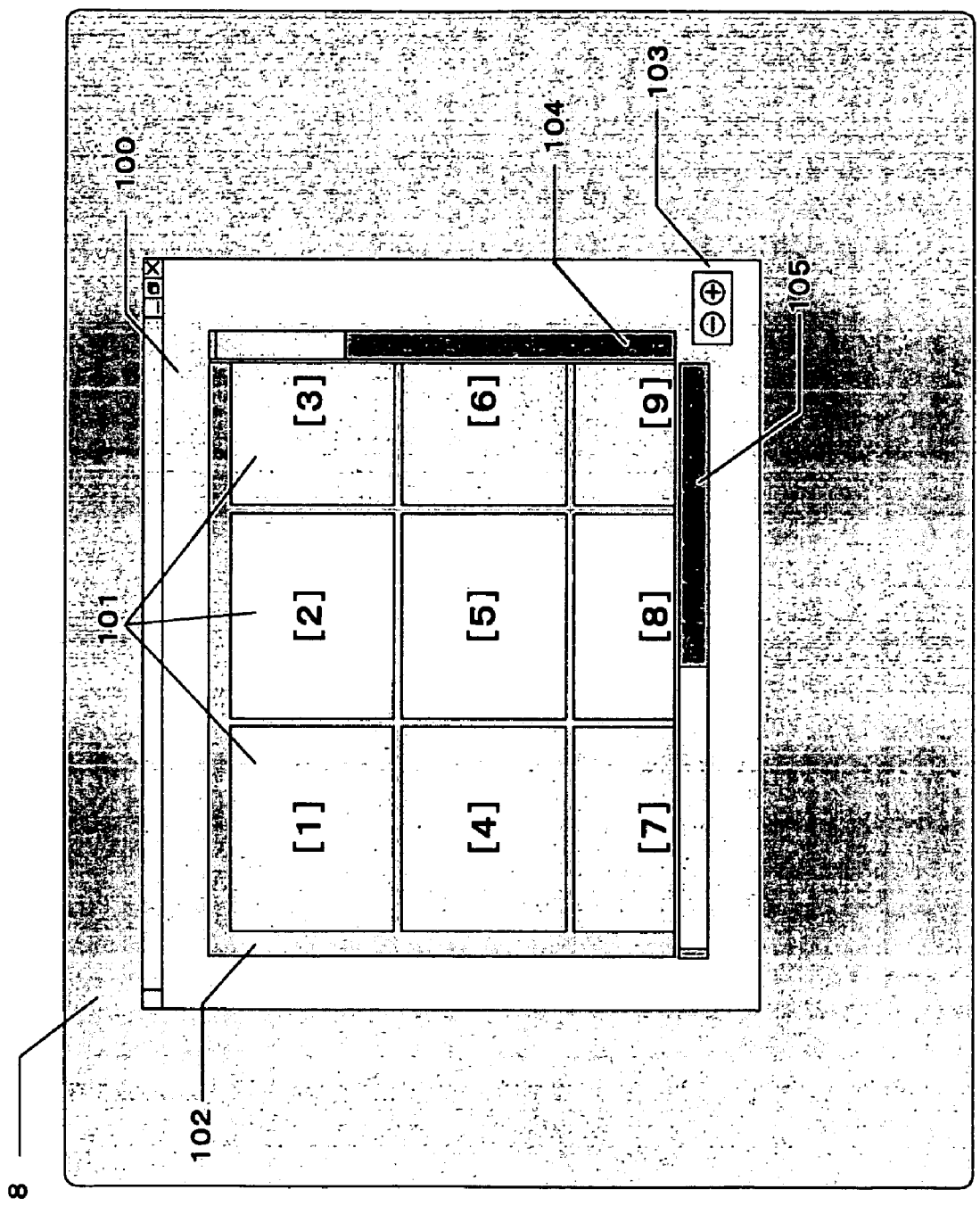
FIG. 4 shows an example of the display screen of a monitor 8 (No. 2)

When the start button is pushed, the image display window 60, control window 80 and recipe window 90 are shut and a progress window 100 as shown in FIG. 4 is newly displayed and shooting is started.

The progress window 100 can display all images 101 (hereinafter called "progress images 101") in the shooting range for the number of lists registered in the recipe window 90 (number of registered lists=9 in FIG. 4). The progress window 100 comprises a multi-monitor area 102 for displaying these progress images 101, an image size modification button 103 for enlarging/reducing each progress image displayed in the multi-monitor area 102, and a vertical scroll bar 104 and horizontal scroll bar 105 which appear when all progress images 101 are not accommodated in the multi-monitor area 102.

Each progress image 101 is disposed at and displayed on [1], [2], [3], . . . and [9] shown in FIG. 4, in accordance with the list order registered in the recipe window 90, and a progress image 101 in the image range where no image is taken is not displayed.

Figure 5:
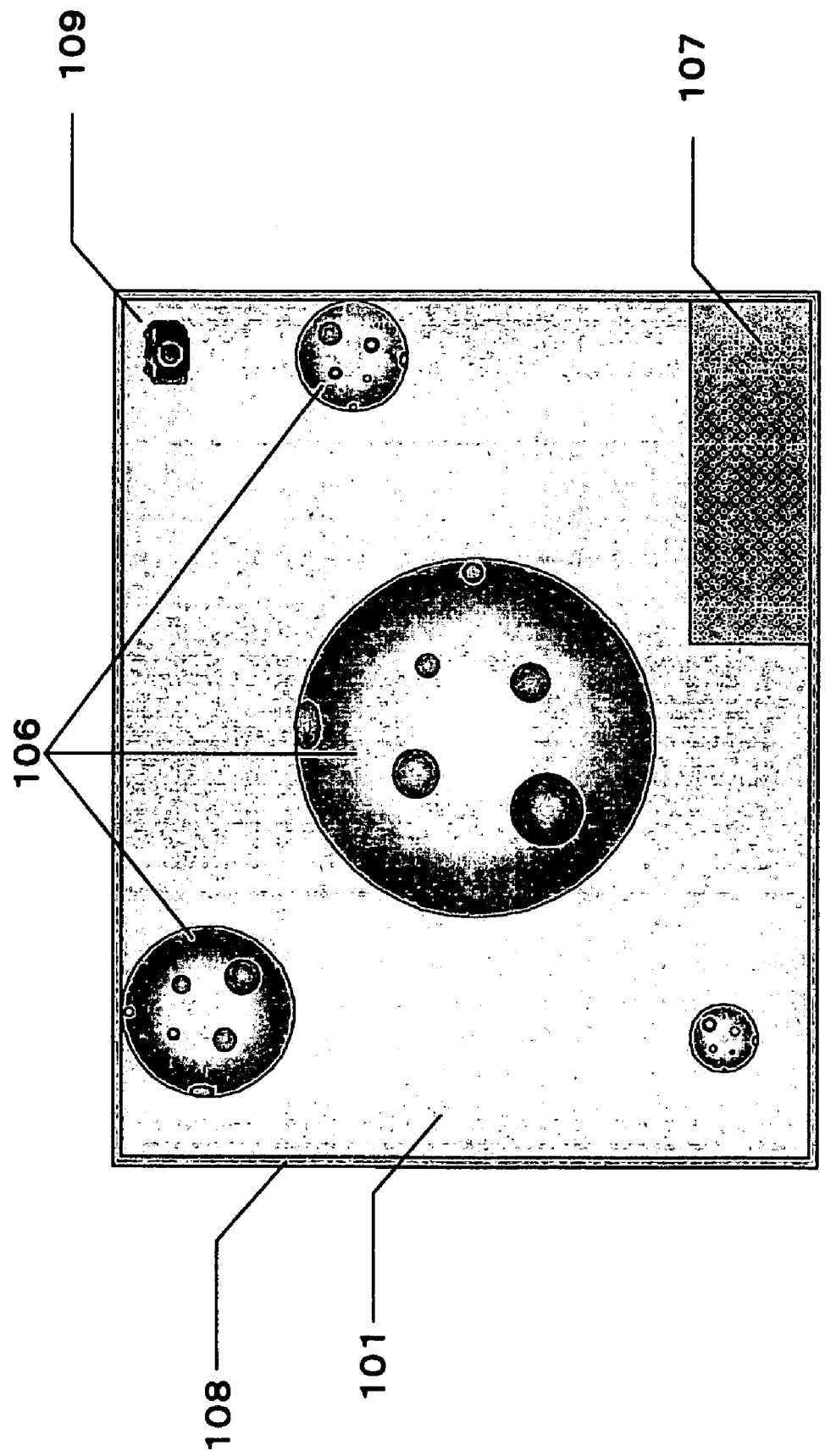
FIG. 5 explains a progressing image 101.

Each progress image 101 is composed as shown in FIG. 5, and a shooting target, such as a cell 106 which changes with the lapse of time or the like, can be observed as the latest status taken in a shooting sequence, which will be described later, there.

Figure 6:
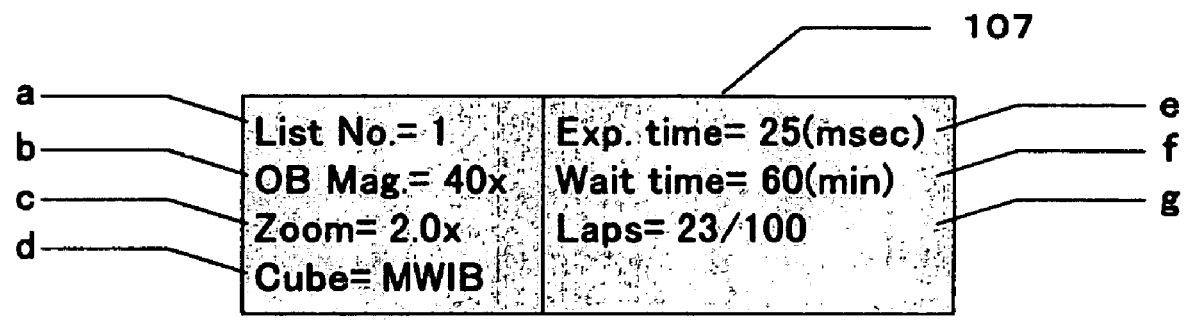
FIG. 6 shows an example of the display of shot data display area 107.

As shown in FIG. 6, a variety of information used for shooting, such as a list number (a), object lens magnification (b), zoom magnification (c), optical device information (d), exposure time (e), time-lapse waiting time (f), taken number of images/total number of images (g) and the like, are displayed in a shot data display area 107. The display position of this shot data display area 107 can be moved to an arbitrary place within each progress screen by the drag operation by a mouse, for example, of an observer.

As shown in FIG. 5, if the progress image 101 is a still image, a camera mark is used as a status mark 109, and if it is a real-time image, which will be described later, a video camera mark is used (see FIG. 9) so that the type and status of an image can be known at a glance. An outer frame 108 is provided in the outer circumstance of each progress image 101.

Next, an actual multi-point time-lapse shooting sequence is described.

Figure 7:
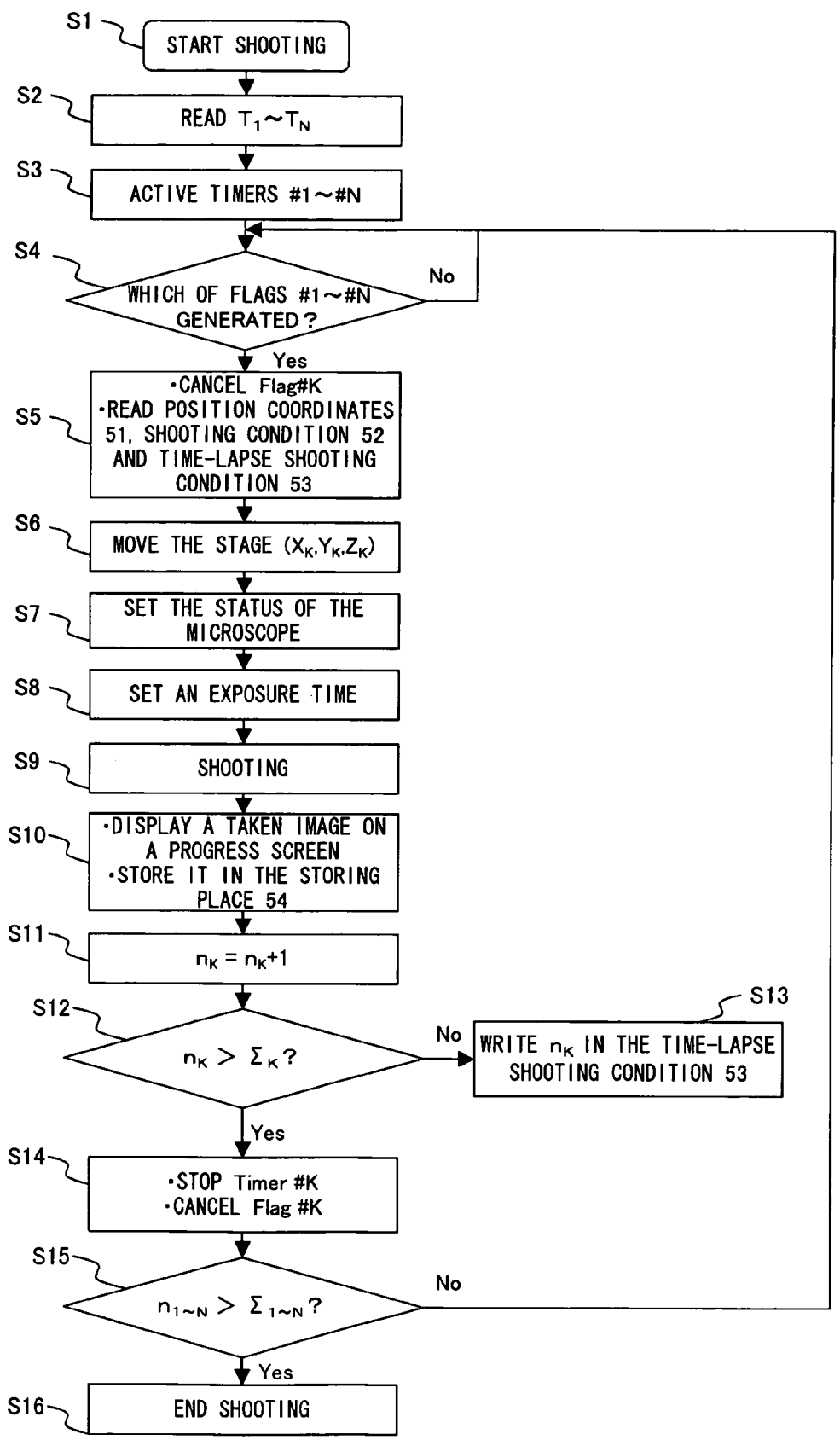
FIG. 7 is a flowchart showing the multi-point time-lapse shooting sequence of the first preferred embodiment.

FIG. 7 is a flowchart showing the multi-point time-lapse shooting sequence of the first preferred embodiment.

Firstly, when shooting is started in step S1, in step S2, the camera control unit 71 reads all time-lapse waiting times $T_1$-$T_N$ from the time-lapse shooting conditions 53 in each shooting information 50 of #1-#N stored in the shooting information DB 18. In step S3, N independent timers #1-#N, which continue a loop operation at each time are activated. When the preset times $T_1$-$T_N$ elapse, these timers #1-#N generate flags #1-#N, respectively, indicating each shooting time.

Then, in step S4, the camera control unit 71 determines which of flags #1-#N is generated. If even one flag is detected (yes in step S4), in step S5 the positional coordinate 51 ($X_K$, $Y_K$, $Z_K$), shooting condition 52 and time-lapse shooting condition 53 of a corresponding shooting range #K (K is one shooting range number corresponding to the generated flag in the shooting range 50, that is, an arbitrary number of #1-#N) are read, and also the generated flag #K is canceled. Then, in step S6, the electromotive stage 2 is moved to the coordinates. In step S7, the statuses of a microscope, such as illumination light, an optical device and the like, are set based on each piece of data in the shooting condition. In step S8, an exposure time is specified for the camera unit 6.

After these settings are completed, in step S9 the camera control unit 71 controls the camera unit 6 and takes a picture. In step S10, the taken image is displayed on the corresponding progress screen of the progress window 100, and also is stored in the corresponding image storage place as a file. This file name is automatically set by the combination of, for example, a character string indicating a shooting range and a sequentially consecutive figure.

Then, in step S11, the total number of taken images, $n_K$ of the time-lapse shooting condition 53 read in step S5 is incremented. In step S12, the total number of taken images $n_K$ is compared with the preset time-lapse number of taken images $\Sigma_K$ similarly read in step S5.

If $n_K > \Sigma_K$ is not satisfied (no in step S12), in step S13 the incremented $n_K$ is written in the time-lapse shooting condition 53, and the process returns to step S4. Then, the loop in step S4 is continued until a new flag is detected.

If $n_K > \Sigma_K$ is satisfied (yes in step S12), it is determined that the preset time-lapse number of taken images is reached, in step S14 the timer #K of the processed shooting range #K is stopped and the flag #K is canceled. Thus, no shooting event of the shooting range #K will occur in the future, and the time-lapse shooting at #K is completed.

Then, in step S15, the camera control unit 71 determines whether each preset time-lapse number of taken images is reached in all shooting ranges. Specifically, $n_1 > \Sigma_1$, $n_2 > \Sigma_2$, . . . and $n_K > \Sigma_K$ are all satisfied (yes in step S15), it is determined that time-lapse shooting is completed for all shooting ranges, and in step S16 the shooting operation finishes. Otherwise (no in step S15), it is determined that time-lapse shooting is not completed for all shooting ranges, and the process returns to step S4.

In this way, by repeating shooting, based on corresponding shooting information if it is detected that an arbitrary timer generates a new flag, multi-point time-lapse shooting can be realized.

Figure 8:
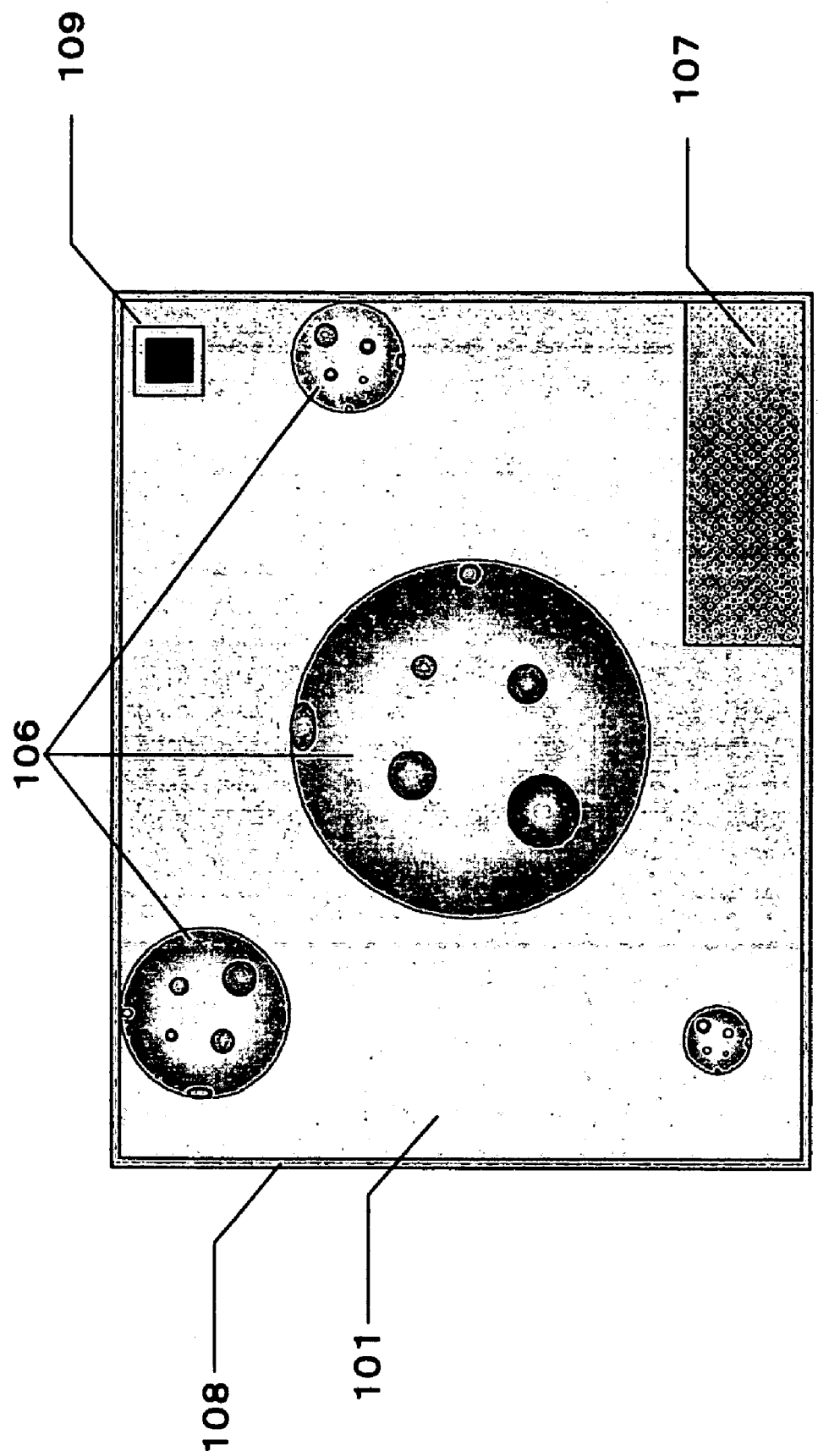
FIG. 8 explains the progressing image 101 in the case where time-lapse shooting is completed.

In the progress image 101 corresponding to the observation range whose time-lapse shooting is completed, the status mark 109 is modified from one shown in FIG. 5 to one shown in FIG. 8, and the observer is notified of the shooting completion.

Next, a variety of operations which can be made while performing multi-point time-lapse shooting according to the above-described flowchart (FIG. 7) are described.

Figure 9:
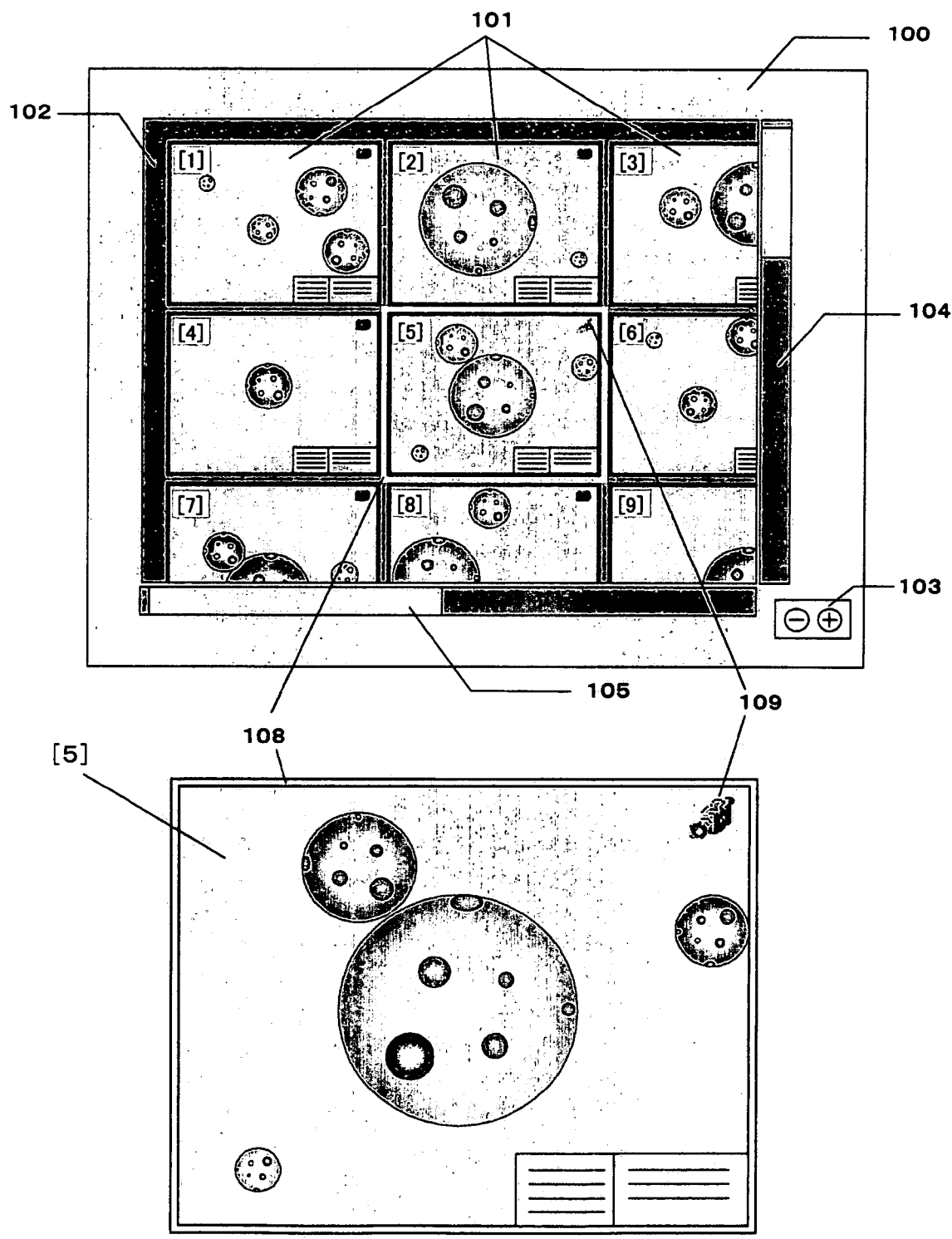
FIG. 9 shows an example of the progressing image 101 whose [5] displays a real-time image.

Firstly, in FIG. 4, the progress image [5] in the multi-monitor area 102 is double-clicked by a mouse while an observer is shooting. In this case, if the shooting sequence is looping in step S4 of the flowchart, specifically if it is waiting for a subsequent shooting timing, the exposure times of each drive unit and camera unit 6 of a microscope are controlled based on shooting information #5 corresponding to the progress image [5], and as shown in FIG. 9, a real-time image is displayed on the progress screen [5]. In this case, by high-lighting the outer frame 108 of the progress image [5] and modifying the status mark 109 to a video camera mark, it is emphasized that it is not a still image to which time-lapse shooting is applied and a real-time image.

If it is waiting for a subsequent shooting timing when double-clicking the progress image [5], neither high-lighting of the outer frame 108 nor modification of status mark 109 is made and it is notified that no real-time display is available. If a subsequent shooting flag is generated during real-time display, the highlighting of the outer frame 108 is canceled, the status mark 109 is restored to a camera mark and it is notified that no real-time display is available.

In the progress image [5] during real-time display too, a display size or display position can be modified by operating an image size modification button 103, a vertical scroll bar 104 or a horizontal scroll bar 105 as in other progress images [1]-[4] and [6]-[9] displaying still images.

Figure 10:
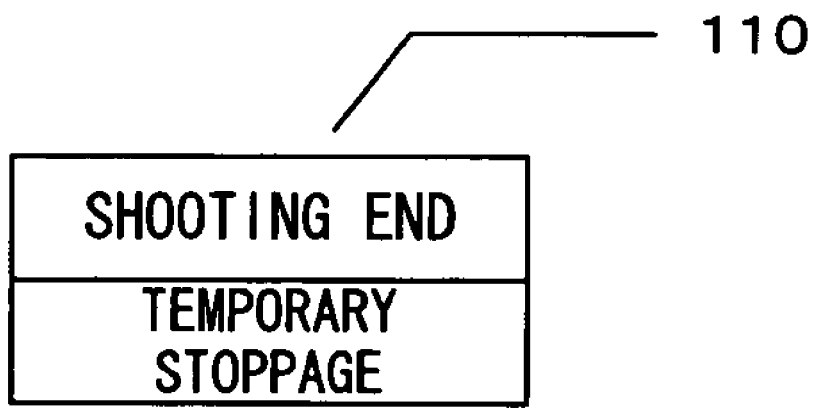
FIG. 10 shows an example of a pop-up menu 110.
Figure 11:
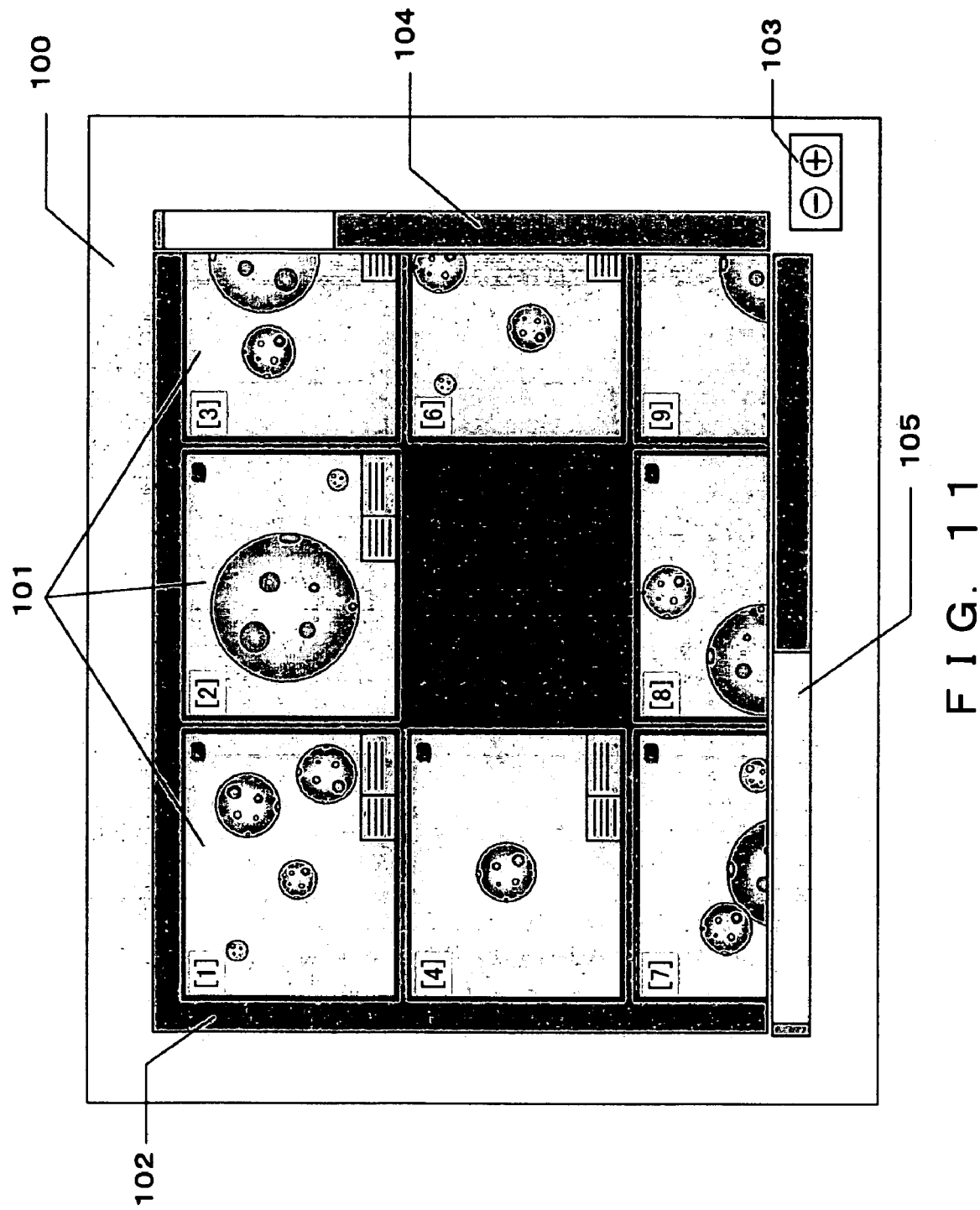
FIG. 11 shows an example of the progressing image 101 whose [5] is deleted from a multi-monitor area 102.

In FIG. 4, if an observer clicks (pushes) the right button of a mouse on the progress image [5] of the multi-monitor area 102 while shooting, a pop-up menu 110 as shown in FIG. 10 appears. If "shooting end" is selected from this pop-up menu 110, the camera control unit 71 stops the timer #5 which controls the shooting timing of the shooting information #5 and cancels the flag #5. Thus, according to the flowchart shown in FIG. 7, no time-lapse shooting of #5 is made. In this case, in the progress window 100, the progress image [5] is deleted from the multi-monitor area 102, as shown in FIG. 11.

If "temporary stoppage" is selected from the pop-up menu 110 shown in FIG. 10, the camera control unit 71 stops the timer #5 which controls the shooting timing of the shooting information #5 and cancels the flag #5. Thus, according to the flowchart shown in FIG. 7, no time-lapse shooting of #5 is made and it enters a temporary stoppage mode. In this case, in the progress window 100, the status mark 109 on the progress image [5] is simply modified to a mark indicating temporary stoppage, and the progress image [5] is not deleted from the multi-monitor area 102, as shown in FIG. 12.

Then, as to #5 in a temporary stoppage mode, a variety of parameters which are stored in positional coordinates 51, a shooting condition 52 or a time-lapse shooting condition can be modified. Specifically, if the right button of the mouse is clicked (pushed) again on the progress image [5] shown in FIG. 12, a pop-up menu as shown in FIG. 13 appears. If "shooting condition modification" is selected from this pop-up menu 111, it shifts to a condition modification mode. Specifically, the control window 80 shown in FIG. 13 appears, and also the progress screen [5] displays a real-time image, as described with reference to FIG. 9. If the observer the shooting start button, which is not shown in FIG. 6, in the control window 80 after arbitrarily modifying an observation position, the amount of illumination light, a time-lapse waiting time, the number of taken images or the like, the modified data is rewritten in the positional coordinates 51, shooting condition 52, time-lapse shooting condition 53. Then, the progress screen [5] on which a real-time image is displayed is restored to FIG. 12 and enters a temporary stoppage mode.

Figure 12:
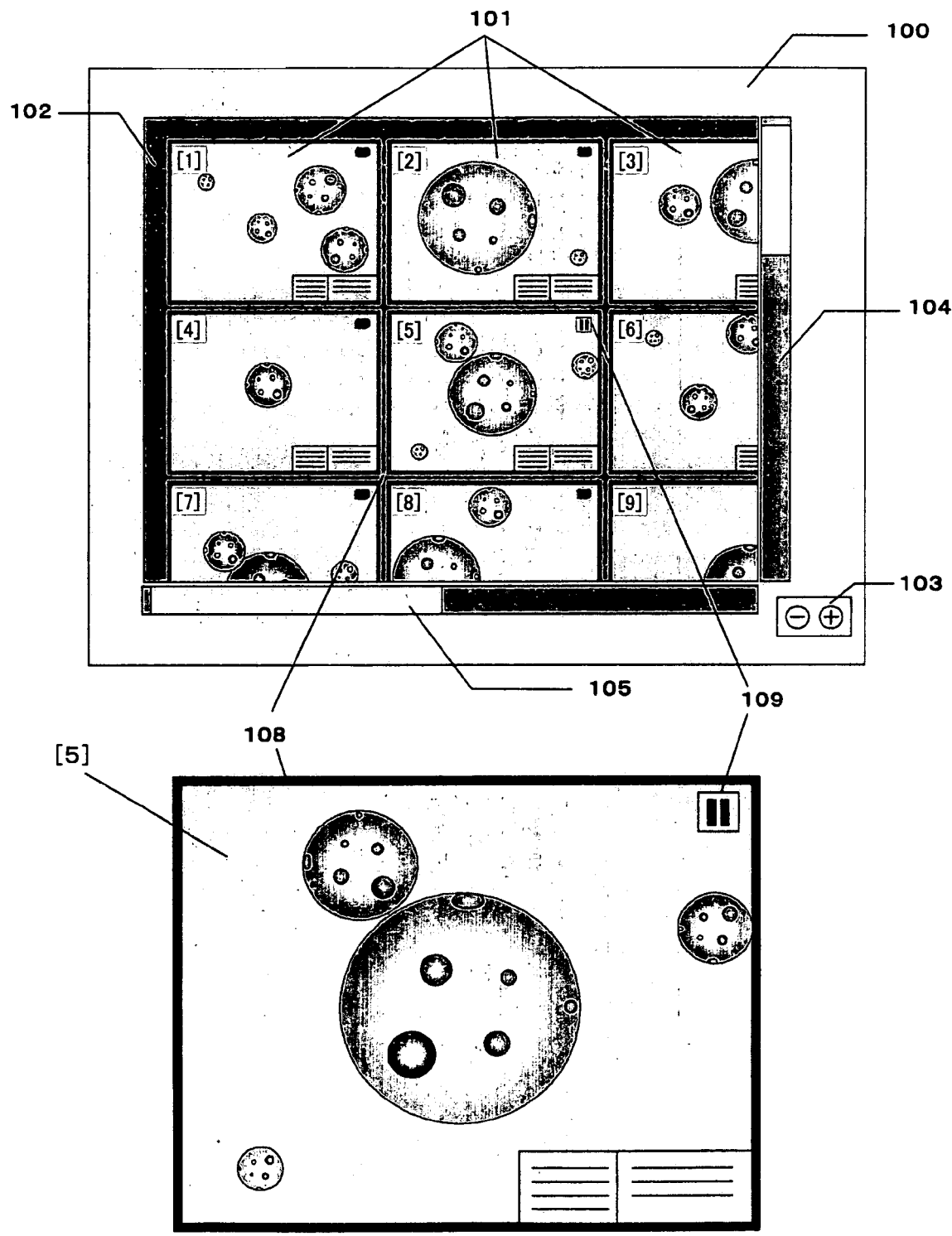
FIG. 12 shows an example of the progressing image 101, the status mark 109 on [5] of which changes to a mark indicating temporary stoppage.
Figure 13:
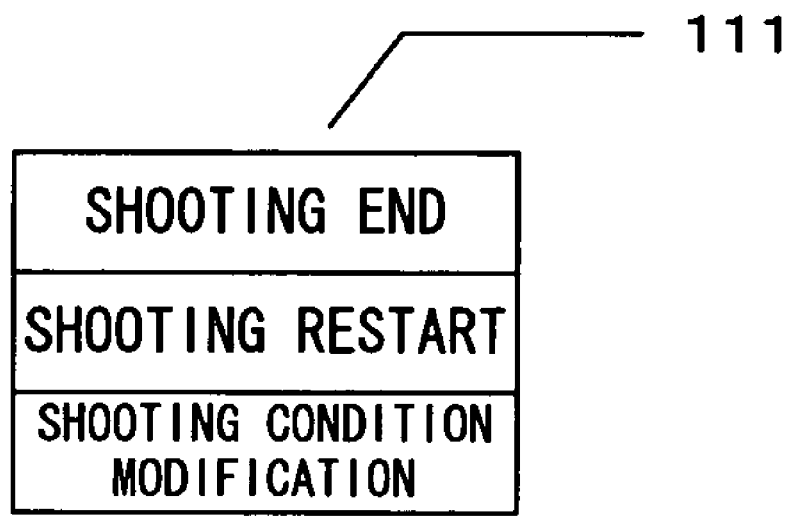
FIG. 13 shows an example of a hop-up menu 111.

If the observer further clicks (pushes) the right button of the mouse on the progress image [5] shown in FIG. 12 and selects "shooting re-start" from the pop-up menu 111, the camera control unit 71 generates flag #5 and re-activates timer #5 after resetting it (setting it to 0) in a stoppage status. Thus, according to the flowchart shown in FIG. 7, the time-lapse shooting of #5 is restarted based on the new modified conditions.

If during the above-described condition modification mode, the shooting timing of another shooting range is generated in step S4 of the flowchart shown in FIG. 7, a message box is displayed on the monitor 8 so that the observer can determine whether to continue the current condition modification while making it wait for shooting in the shooting range or to interrupt the condition modification to continue the time-lapse shooting.

As described above, by adopting the configuration and method described in the first preferred embodiment, each independent number of images can be taken at each independent time-lapse waiting time when applying multi-point time-lapse shooting in which time-lapse shooting can be applied to a plurality of shooting ranges. Therefore, a plurality of cells which differently change with the lapse of time or the like can be shot at one time, thereby greatly reducing a shooting time.

Since the latest image in each shooting range can be displayed on a multi-screen, the behavior of each inspection object can be monitored in all observation ranges at a glance, thereby anticipating and avoiding any shooting mistake due to the change of status of each inspection object.

Since only an observation range whose continued shooting is no more needed can be interrupted during multi-point time-lapse shooting, a wasteful shooting time can be reduced and the waste of storage memory due to an unnecessary file can be avoided.

Furthermore, since a temporary stoppage/re-start function is added for each shooting range, time-lapse shooting can be scattered only in a necessary observation time range. Therefore, the further reduction of a shooting time and the storage memory capacity can be realized.

Since a variety of shooting conditions can be modified during temporary stoppage, a shooting mistake due to the movement of an inspection object 4, a shooting exposure mistake due to the change in the amount of light due to the time change of the inspection object 4 and the like can be avoided or corrected in advance. Furthermore, since an appropriate time-lapse waiting time can be always reset even when an inspection object 4 rapidly changes in the middle, no shooting timing is lost.

Furthermore, a function to display a real-time image in an arbitrary shooting range during multi-point time-lapse shooting, and the correction of a shooting condition can be exactly made and a stable shooting operation can be realized.

Furthermore, since a GUI such that these shooting status modification in the middle can be made by an operation on a multi-screen which progresses for all observation ranges is adopted, good and easy maintenance can be realized during shooting.

THE SECOND PREFERRED EMBODIMENT

Next, the second preferred embodiment of the present invention is described.

Since the second preferred embodiment has the same configuration as the above-described first preferred embodiment, the second preferred embodiment is described with reference to FIG. 1. Since its GUI is also the same as that of the first preferred embodiment, this GUI is referenced.

Figure 14:
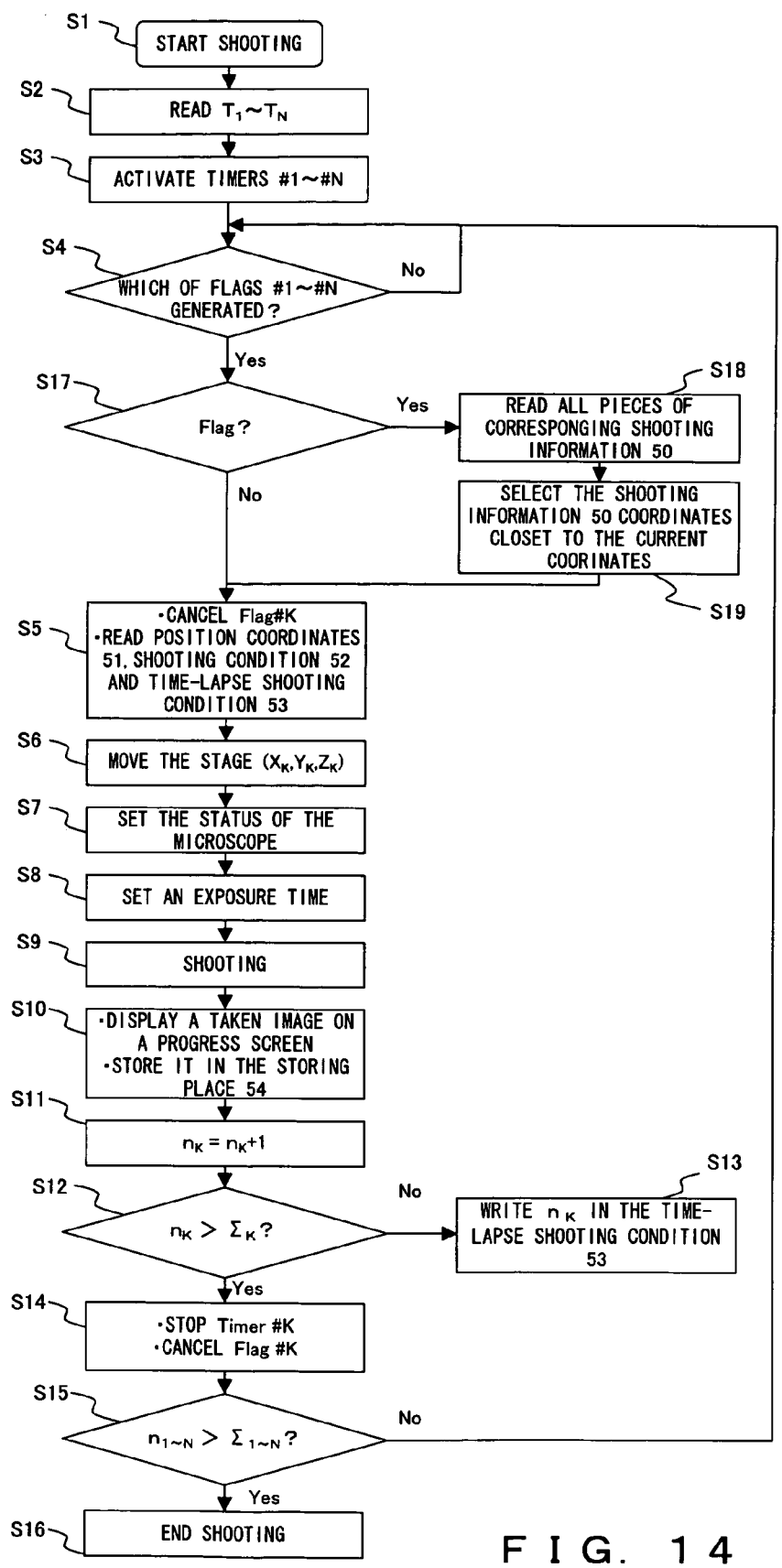
FIG. 14 is a flowchart showing the multi-point time-lapse shooting sequence of the second preferred embodiment.

Since the multi-point time-lapse shooting sequence of the second preferred embodiment can be obtained by partially modifying that of the first preferred embodiment, a flowchart in which a new number is attached to a sequence different from that shown in FIG. 7 and the same numbers are attached to the others are shown in FIG. 14, and the multi-point time-lapse shooting sequence of the second preferred embodiment is described with reference to it.

The second preferred embodiment differs from the above-described first preferred embodiment in the shooting order in the case where there is the same shooting timing in a plurality of shooting ranges.

In step S4, the camera control unit 71 determines which of flags #1-#N is generated. If it is detected that even one flag is generated (yes in step S4), firstly, in step S17 it is detected whether a plurality of flags are generated. If only one flag is generated (no in step S17), the same sequence as the first preferred embodiment is applied. Specifically, in steps S5 and after, the electromotive stage 2 is moved based on the positional coordinates 51 ($X_K$, $Y_K$, $Z_K$) of the shooting range #K, and shooting is conducted based on the shooting condition 52 and time-lapse shooting condition 53 of #K.

If it is determined that a plurality of flags are generated (yes instep S17), in step S18 the camera control unit 71 reads all positional coordinates 51 corresponding to each generated flag, and in step S19, it calculates the distance between each positional coordinates 51 and the current stage position, and determines the shortest positional coordinates 51, that is, a subsequent good shooting range in which the moving distance of the electromotive stage 2 is the shortest.

Then, after calculating the shortest and movable shooting range #K, shooting is repeated according to the sequences of steps S5 and after.

Thus, a time needed for shooting can be reduced as much as possible when shooting a plurality of shooting ranges reaching shooting chances, thereby realizing highly accurate multi-point time-lapse shooting can be applied for a preset time-lapse waiting time.

Although in the first and second preferred embodiments of the present invention, the distance between the inspection object 4 and the object lens 3 is adjusted by vertically moving the electromotive stage 2, the same effect can also be obtained, for example, by vertically driving a revolver 31 for mounting the object lens 3 instead.

If the data of a shooting time, the culture environment of a cell (ambient temperature, humidity, carbon dioxide density, etc.) or the like is stored in a storage place 54 as a text file (file with an extender, such as .txt, etc.) with the same file name of an image file besides image data when storing the taken time-lapse image, data can be efficiently managed.

Although in the above description, one inspection object 4 is mounted on the electromotive stage 2 and a plurality of positions of the inspection object 4 are shot, the number of the inspection objects 4 can be arbitrary as long as the positional coordinates (X, Y, Z) of the electromotive stage 2 is managed. For example, even when a stage with a mechanism for mounting and fixing a plurality of inspection objects is used, quite the same effect can be obtained.

Although so far each preferred embodiment of the present invention has been described with reference to the drawings, a Photo-micrographing device to which the present invention is applied is not limited to the above-described preferred embodiments as long as its function is realized. It can be a stand-alone device or a system or incorporated apparatus composed of a plurality of devices.

Specifically, the application of the present invention is not limited to the above-described preferred embodiments, and it can take a variety of configuration or shape as long as the subject matter of the present invention is deviated.

According to the present invention, since each independent number of images can be taken at each independent time-lapse waiting time when conducting multi-point time-lapse shooting, a plurality of cells which changes with the different lapse of time or the like can be shot at one time, thereby greatly reducing a shooting time.

According to the present invention, since the latest image of each shooting range can be displayed on a multi-screen, the behaviors of an inspection object can be monitored in all observation ranges at a glance, thereby quickly catching the status change of each inspection object.

According to the present invention, since only an observation range, the shooting of which there is no need to continue during multi-point time-lapse shooting can be interrupted. Therefore, useless shooting time can be reduced, and the waste of storage memory due to an unnecessary image file can be avoided.

According to the present invention, a variety of shooting conditions can be modified during the temporary stoppage of time-lapse shooting. Therefore, for example, inaccurate shooting due to movement of an inspection body, inaccurate shooting exposure due to change of the amount of light accompanying the time change of the inspection object and the like are avoided and can be corrected in advance. Furthermore, even when the inspection object rapidly changes in the middle, an appropriate time-lapse waiting time can be always reset. Therefore, no shooting chance is lost.

According to the present invention, the correction of shooting conditions during temporary shooting stoppage or the like can be precisely made, thereby realizing a stable shooting operation.

According to the present invention, when shooting a plurality of shooting ranges reaching shooting chances, a time needed to shoot them can be reduced as much as possible. Therefore, highly accurate multi-point time-lapse shooting can be applied at a preset time-lapse waiting time.

What is claimed is:

1. A photo-micrographing device, comprising:
    a microscope whose stage for holding an inspection object and whose objective lens for focusing light which has been incident on the inspection object can be relatively moved three-dimensionally;
    a camera unit for shooting the inspection object and obtaining an image of the inspection object;
    a position storage unit for setting a plurality of view fields of the microscope by relatively moving at least one of the stage and the objective lens, and storing position information of the stage corresponding to each view field;

a setting information storage unit for storing setting information of the microscope and the camera unit in each view field;

a time-lapse information storage unit for storing shooting conditions corresponding to each view field where time-lapse shooting is applied;

a camera control unit for obtaining a time-lapse shooting image for each view field where the time-lapse shooting is applied, based on the position information stored in the position storage unit, the setting information stored in the setting information storage unit corresponding to the position information, and the shooting conditions stored in the time-lapse information storage unit; and an image display unit for collectively displaying latest time-lapse shooting images taken by the camera unit for each view field where the time-lapse shooting is applied.

2. The photo-micrographing device according to claim 1, wherein:

the camera control unit has a shooting interruption control function to interrupt a shooting operation for each view field during the time-lapse shooting, and a shooting re-start control function to re-start the interrupted shooting, and the image display unit has a shooting status notification function to display and notify that the shooting is interrupted by the shooting interruption control function and that the shooting is restarted by the shooting re-start control function.

3. The photo-micrographing device according to claim 2, wherein each of the position storage unit, the setting information storage unit and the time-lapse information storage unit has an information modification function to enable modification of stored information about the view fields when the shooting is interrupted by the shooting interruption control function.

4. The photo-micrographing device according to claim 1, wherein:

the camera control unit has a real-time imaging function to shoot a live image of a selected view field while not applying the time-lapse shooting, and the image display unit has a real-time image display function to display the live image from the camera control unit in a display position corresponding to the selected view field.

5. The photo-micrographing device according to claim 1, wherein when determining a shooting order of the plurality of view fields, the camera control unit specifies a closest view field as a subsequent shooting range from among view fields whose shooting is not finished.

6. A photo-micrographing device control method implemented by a microscope whose stage for holding an inspection object and whose objective lens for focusing light which has been incident on the inspection object can be relatively moved three-dimensionally, the method comprising:

shooting the inspection object and obtaining an image of the inspection object;

setting a plurality of view fields of the microscope by relatively moving at least one of the stage and the objective lens, and storing position information of the stage corresponding to each view field;

storing setting information of the microscope and the shooting in each view field;

storing shooting conditions corresponding to each view field where time-lapse shooting is applied;

obtaining a time-lapse shooting image for each view field where the time-lapse shooting is applied, based on the stored position information, the stored setting information corresponding to the position information, and the stored shooting conditions; and collectively displaying latest taken time-lapse shooting images for each view field where the time-lapse shooting is applied.

* * * * *